United States Patent [19]

Massouda

[11] Patent Number: 4,950,510
[45] Date of Patent: Aug. 21, 1990

[54] MULTIPLE LAYER PAPERBOARD LAMINATE

[75] Inventor: Debora F. Massouda, Silver Spring, Md.

[73] Assignee: Westvaco Corporation, New York, N.Y.

[21] Appl. No.: 365,860

[22] Filed: Jun. 14, 1989

[51] Int. Cl.$^5$ .................... B65D 5/56; B65D 5/62
[52] U.S. Cl. .................... 428/34.2; 428/349; 428/511; 428/516; 428/520
[58] Field of Search .................... 428/34.2, 349, 511, 428/512, 516, 520, 412, 476.3, 483

[56] References Cited

U.S. PATENT DOCUMENTS

| | | | |
|---|---|---|---|
| 4,233,367 | 11/1980 | Ticknor et al. | 428/521 |
| 4,698,246 | 10/1987 | Gibbons et al. | 428/34.2 |
| 4,701,360 | 10/1987 | Gibbons et al. | 428/34.2 |
| 4,789,575 | 12/1988 | Gibbons et al. | 428/34.2 |
| 4,795,665 | 1/1989 | Lancaster et al. | 428/34.2 |
| 4,806,399 | 2/1989 | Gibbons et al. | 428/34.2 |

Primary Examiner—James Seidleck

[57] ABSTRACT

A non-foil paperboard laminate having excellent flavor barrier with superior heat sealability comprises paperboard having a layer of a heat-sealable, modified polyolefin extrusion coated onto its outer surface, a layer of low density polyethylene polymer extrusion coated onto its inner surface, and a product-contact barrier layer extrusion coated onto the inner layer of low density polyethylene polymer. The product-contact barrier layer may comprise one or more layers of a polymer having low permeability to flavor oils.

11 Claims, 1 Drawing Sheet

MULTIPLE LAYER PAPERBOARD LAMINATE

Background of Invention

The present invention relates to a paperboard laminate having excellent resistance to the loss of flavor oils and superior heat sealability. Paperboard coated with low density polyethylene has been used for this purpose, but it falls short of providing an acceptable container. Therefore additional barrier layers are required to achieve the desired goal. It is well known that impermeable materials such as aluminum foil, polar materials such as polyamides, polyethylene terephthalates, polyvinylidene chlorides, polyvinyl chlorides, etc., and highly crystalline non-polar materials such as high density polyethylene and polypropylene provide varying degrees of barrier resistance. However, when additional barrier materials are added to such structures, the manufacturing process becomes complex because of the basic incompatibility of some added materials with paperboard and low density polyethylene. More importantly, it is essential that the ultimate inner and outer surfaces of the barrier laminate be readily heat-sealable to provide reliable structures for use in the field. Low density polyethylene is the most desireable material to have on both the inner and outer surfaces of such a laminate in order to achieve good heat sealability. However, when low density polyethylene (LDPE) is used as the product-contact layer in citrus juice containers, the LDPE tends to absorb the essential oils of the juice after short periods of time causing loss of flavor, integrity decay of heat seals, and stress cracking of the layer. Therefore, it is preferable to use a different material for the product-contact layer. However, when the product-contact layer is changed for this purpose, the outer heat-sealable layer of the laminate must also be changed or modified to retain the desired quality of good heat sealability.

U.S. Pat. Nos. 4,698,246; 4,701,360; and 4,806,399 each disclose paperboard laminates with different product contact layers while retaining low density polyethylene (LDPE) as the outer heat-sealable layer. However, each of the structures disclosed in these patents present manufacturing problems. Some have been found to be unreliable in the field, while cost and manufacturing problems are associated with the other structures. In accordance with the present invention a novel and improved structure has been developed to overcome all of the problems attendant with the relevant prior art.

SUMMARY OF THE INVENTION

It is an object of the present invention to provide an improved heat-sealable, non-foil laminate for fruit or citrus juices, beverages and the like which is easy to manufacture and which provides reliable performance in the field.

It is another object of the present invention to provide a novel laminate structure with superior heat sealability and good resistance to loss of flavor oils when the laminate is used to make containers for such products as fruit or citrus juices.

In one embodiment of the present invention, paperboard (having sufficient thickness for the intended use) is flame treated both sides, an outer layer of a modified polyolefin compatible with and heat sealable to the ultimate inner coating of the laminate is extrusion coated onto the outer surface of the paperboard, and an inner coating of low density polyethylene polymer is extrusion coated onto the inner suface of the paperboard. The inner layer of low density polyethylene polymer is flame treated and overcoated with a suitable product-contact barrier material having good resistance to the absorption of flavor oils, selected from the group consisting of ethylene vinyl copolymer (EVOH), polyethylene terephthalate, polyethylene isophthalate, acid- or glycol- modified copolymers of these polyesters, polyamides, polycaprolactams, and polycarbonates. The outer layer of modified polyolefin is selected to be compatible with and easily heat-sealable to the product-contact layer and is preferably an extrudable adhesive resin such as PLEXAR, a modified polyolefin or modified copolymer of an olefin, such as ethylene and other materials, for example ethylene-vinyl acetate. In an alternative embodiment, the product-contact coating may comprise multiple barrier layers which are coextruded onto the inner layer of low density polyethylene polymer in the form of a sandwich comprising, one or more tie layers and two or more layers of barrier material selected from the group consisting of ethylene vinyl copolymer (EVOH), polyethylene terephathalate, polyethylene isophthalate, acid- or glycol-modified copolymers of these polyesters, polyamides, polycaprolactams and polycarbonates. In any event, the final structure yields a construction which includes a barrier material on its product-contact inner surface and as its outer surface, a modified polyolefin having superior heat sealability to the inner product-contact barrier layer. The structure of the present invention is readily manufactured on existing equipment and provides a more reliable laminate than taught by the prior art. Cartons constructed from the laminate of the present invention provide significant flavor oil retention of the citrus juices contained therein, and also significant prevention of loss of Vitamin C, resulting in an extended shelf life for the juices.

DETAILED DESCRIPTION

Figure 1:
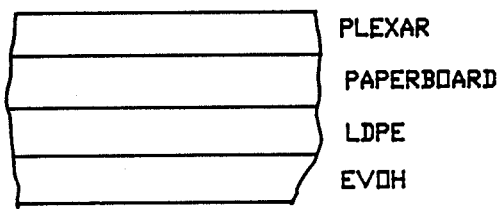
FIG. 1 is a cross-sectional elevation of one embodiment of the laminate according to the present invention.
Figure 2:
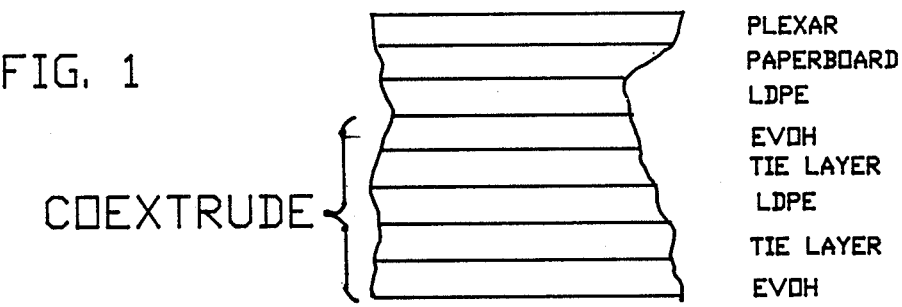
FIG. 2 is a cross-sectional elevation of another embodiment of the laminate according to the present invention.
Figure 3:
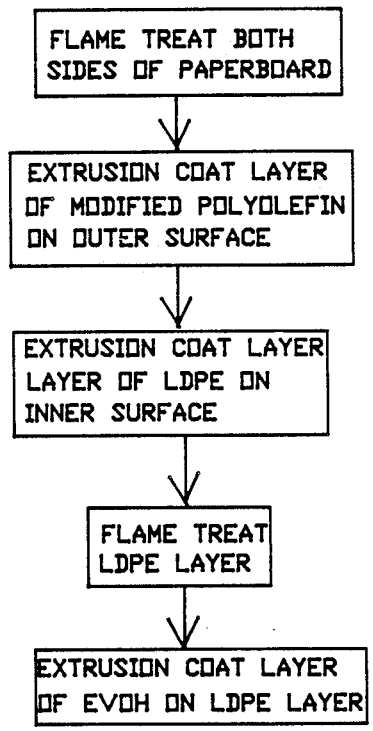
FIG. 3 is a block diagram representing a process for making one embodiment of the present invention; and, FIG. 4 is a block diagram representing a process for making another embodiment of the present invention.
Figure 4:
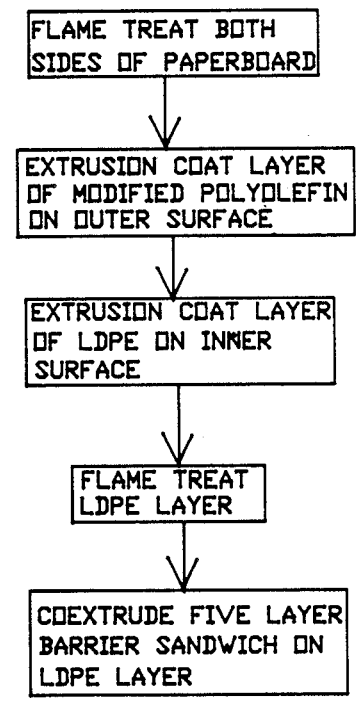

In one embodiment of the present invention the laminate is prepared as follows:

Stepwise, the paperboard substrate is flame treated on both surfaces. Second, a layer of a modified polyolefin designed to be heat sealable with the product-contact barrier coating is extrusion coated onto the outer surface of the paperboard. The modified polyolefin is preferably an extrudable adhesive resin such as PLEXAR, a modified polyolefin or modified copolymer of an olefin, such as ethylene and other materials, for example ethylene-vinyl acetate.

Thirdly, a layer of low density polyethylene polymer (LDPE) is extrusion coated onto the inner surface of the paperboard, and flame treated. And lastly, extrusion coated onto this flame treated inner surface is a product-contact barrier material selected from the group consisting of ethylene vinyl alcohol copolymer (EVOH), polyethylene terephthalate, polyethylene isophthalate, acid- or glycol- modified copolymers of these polyesters, polyamides, polycaprolactams, and polycarbonates. In an alternative embodiment, the laminate may be prepared as set forth above but with additional barrier layers. For this purpose a five-layer sandwich comprising EVOH/tie layer/LDPE/tie layer/EVOH or a three-layer sandwich comprising EVOH/tie layer/EVOH may be coextruded onto the flame-treated surface of the LDPE layer. The newly formed laminate is arranged so that the barrier material becomes the inner product-contact surface of any containers made from the laminate, and the laminate is scored, cut into blanks, folded and side seam heat-sealed in a conventional manner. The prepared blanks are ready for filling and sealing on standard equipment in the usual course of business.

The barrier laminate produced by the present invention exhibits excellent barrier properties and meets FDA approval for use in food contact packaging. As an example, the first embodiment of the laminate of the present invention may comprise an exterior coating of up to 14 lb/ream of a modified polyolefin, paperboard of varying thickness (depending upon carton size), an interior coating of up to 10 lbs/ream LDPE and up to 5 lbs/ream of a product-contact barrier coating applied to the inner LDPE layer. Meanwhile, the five-layer sandwich coextrusion for the alternative structure may comprise up to 8 lbs/ream barrier material, up to 5 lbs/ream tie layer, up to 10 lbs/ream LDPE, up to 5 lbs/ream tie layer and up to 5 lbs/ream barrier material. In the three layer structure the coat weights may comprise up to 8 lbs/ream barrier material, up to 8 lbs/ream tie layer and up to 5 lbs/ream barrier material. Ream size is 3000 ft$^2$, and the coat weights vary depending upon the product packaged and the carton size.

The modified polyolefin, or more correctly, the outer polyolefin layer modified to be compatible with and heat sealable to the inner product-contact barrier material is preferably selected from a group of materials indentified by the trademark PLEXAR, and more particularly, PLEXAR 177 or PLEXAR 175.

The PLEXARS 175 and 177 are modified, low density polyethylene-based adhesives which provide strong bonds to ethylene vinyl alcohol copolymers (EVOH), high and low density polyethylenes, ethylene copolymers, paper and paperboard. They are suitable for both coextrusion coating and cast film coextrusion. The tie layers used in the alternative embodiment of the present invention would also preferably be PLEXARS. The PLEXAR class of adhesives are available from USI Corporation and are fully described in U.S. Pat. Nos. 4,087,587 and 4,087,588.

The preferred flavor-barrier material for the product-contact layer is ethylene vinyl alcohol copolymer (EVOH). An example is Eval EP resin available from Eval Company of America.

The laminate of the present invention yields barrier characteristics substantially equivalent to the most desirable products disclosed in the prior art and provides superior heat-sealability. Accordingly, it is to be understood that the invention herein is not confined to the particular embodiments described, but embraces all such modifications thereof as may come within the scope of the following claims.

What is claimed is:
1. A paperboard container, the container being constructed from a lmainate comprising:
    (a) a paperboard substrate having opposed inner and outer surfaces;
    (b) a layer of heat-sealable, modified polyolefin copolymer of ethylene and ethylene-vinyl acetate coated onto the outer surface of said paperboard substrate;
    (c) a layer of low density polyethylene polymer (LDPE) coated onto the inner surface of said paperboard substrate; and,
    (d) an inner, product-contact barrier layer coated onto said layer of low density polyethylene (LDPE), said barrier layer being selected from the group consisting of ethylene vinyl alcohol copolymer (EVOH), polyethylene terephthlate, polyethylene isophthalate, acid- or glycol- modified copolymers of polyethylene terephthalate and polyethylene isophthalate, polyamides, polycaprolactans and polycarbonates.

2. The product of claim 1 wherien up to 14 lbs/ream of modified polyolefin is coated onto the outer surface of the paperboard substrate.

3. The product of claim 2 wherein up to 10 lbs/ream of LDPE is coated onto the inner surface of the paperboard substrate.

4. The product of claim 3 wherein up to 16 lbs/ream of barrier material is coated onto the layer of LDPE.

5. A paperboard container, the container being constructed from a laminate comprising:
    (a) a paperboard substrate having opposed inner and outer surfaces;
    (b) a layer of heat-sealable, modified polyolefin comprising an extrudable adhesive resin copolymer of polyethylene and ethylenevinyl acetate coated onto the outer surface of said paperboard substrate;
    (c) a layer of low density polyethylene (LDPE) coated onto the inner surface of said paperboard substrate; and,
    (d) an inner, product-contact sandwich layer comprising a barrier layer, a tie layer, a low density polyethylene (LDPE) layer, a tie layer and a barrier layer coextruded onto the layer of low density polyethylene (LDPE) applied to the inner surface of said paperboard.

6. The product of claim 5 wherein the barrier layer is selected from the group consisting of ethylene vinyl alcohol copolymer (EVOH), polyethylene terephthlate, polyethylene isophthalate, acid- or glycol- modified copolymers of polyethylene terephthlate and polyethylene isophthalate, polyamides, polycaprolactams and polycarbonates.

7. The product of claim 6 wherein the product-contact sandwich layer is symmetrical.

8. The product of claim 7 wherein up to 14 lbs/ream of modified polyolefin is coated onto the outer surface of the paperboard substrate.

9. The product of claim 8 wherein up to 10 lbs/ream of low density polyethylene is coated onto the inner surface of the paperboard substrate.

10. The product of claim 9 wherein the inner, product-contact sandwich layer coextruded onto the low density polyethylene polymer layer may comprise up to 8 lbs/ream barrier material, 5 lbs/ream tie layer, 9 lbs/ream LDPE, 5 lbs/ream tie layer, and 5 lbs/ream barrier material.

11. The product of claim 9 wherein the inner, product-contact sandwich layer coextruded onto the low density polyethylene polymer layer may comprise up to 8 lbs/ream barrier material, 8 lbs/ream tie layer, and 5 lbs/ream barrier material.

* * * * *